US012633005B2

(12) United States Patent　　　　(10) Patent No.:　US 12,633,005 B2
Harigai et al.　　　　　　　　　　　　(45) Date of Patent:　May 19, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventors: Jungo Harigai, Kanagawa (JP); Miho Uno, Kanagawa (JP); Yoshitaka Kuwada, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/299,943

(22) Filed: Apr. 13, 2023

(65) Prior Publication Data

US 2024/0054697 A1　　Feb. 15, 2024

(30) Foreign Application Priority Data

Aug. 15, 2022　(JP) ................................. 2022-129310

(51) Int. Cl.
G06T 11/10　　　(2026.01)
G06T 7/40　　　(2017.01)
G06T 7/90　　　(2017.01)
H04N 1/00　　　(2006.01)

(52) U.S. Cl.
CPC ................ G06T 11/10 (2026.01); G06T 7/40 (2013.01); G06T 7/90 (2017.01); H04N 1/00835 (2013.01)

(58) Field of Classification Search
CPC ......... G06T 2200/21; G06T 7/90; G06T 7/40; G06T 11/001; H04N 1/00835
See application file for complete search history.

(56) References Cited

U.S. PATENT DOCUMENTS

| | | | |
|---|---|---|---|
| 6,765,573 B2 | 7/2004 | Kouadio | |
| 8,132,954 B2 * | 3/2012 | Iwasaki | G02B 6/0068 |
| | | | 362/628 |
| 9,495,786 B2 * | 11/2016 | Howell | G06T 5/50 |
| 2002/0080136 A1 | 6/2002 | Kouadio | |

(Continued)

FOREIGN PATENT DOCUMENTS

| | | |
|---|---|---|
| JP | 2002-236938 A | 8/2002 |
| JP | 2013-196492 A | 9/2013 |

(Continued)

OTHER PUBLICATIONS

Tan, K., & Cheng, X. (2017). Specular Reflection Effects Elimination in Terrestrial Laser Scanning Intensity Data Using Phong Model. Remote Sensing, 9(8), 853. https://doi.org/10.3390/rs9080853 (Year: 2017).*

(Continued)

*Primary Examiner* — Kee M Tung
*Assistant Examiner* — Nauman U Ahmad
(74) *Attorney, Agent, or Firm* — Oliff PLC

(57)　　　ABSTRACT

An information processing apparatus includes a processor configured to: acquire information on main illumination from an illumination intensity distribution of an image that results from imaging an actual space; and control an expression of a thing using an illumination intensity distribution that is corrected with the information on the main illumination.

12 Claims, 15 Drawing Sheets

(56)     References Cited

U.S. PATENT DOCUMENTS

| | | | |
|---|---|---|---|
| 2011/0063209 A1* | 3/2011 | Fang | G16H 30/40 |
| | | | 345/157 |
| 2016/0131968 A1* | 5/2016 | Okamoto | H01S 5/0683 |
| | | | 315/151 |
| 2018/0150995 A1* | 5/2018 | Kaneko | G06T 15/506 |
| 2019/0164261 A1* | 5/2019 | Sunkavalli | G06T 7/90 |

FOREIGN PATENT DOCUMENTS

| | | |
|---|---|---|
| JP | 2018-92594 A | 6/2018 |
| WO | 2015093129 A1 | 6/2015 |

OTHER PUBLICATIONS

Mar. 3, 2026 Office Action issued in Japanese Patent Application
No. 2022-129310.

* cited by examiner

30

| | | |
|---|---|---|
| PROCESSOR 31 | | USER INTERFACE 35 |
| ROM 32 | | COMMUNICATION INTERFACE 36 |
| RAM 33 | | |
| AUXILIARY MEMORY 34 | | |

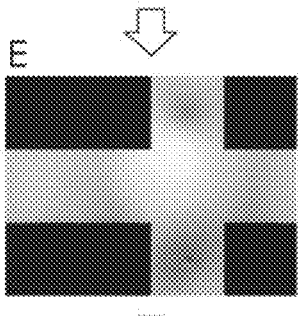

S1: RETRIEVE AMBIENT LIGHT IMAGE FROM CLIENT TERMINAL

E

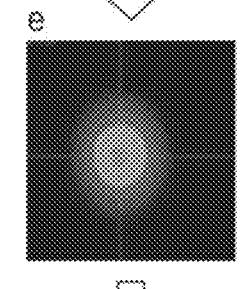

S2: GENERATE ILLUMINATION INTENSITY MAP E e

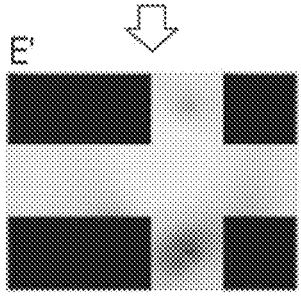

S3: ACQUIRE INFORMATION e ON MAIN ILLUMINATION BY ANALYZING ILLUMINATION INTENSITY MAP E

E'

S4: GENERATE ILLUMINATION INTENSITY MAP E' BY CORRECTING ILLUMINATION INTENSITY MAP E WITH INFORMATION e ON MAIN ILLUMINATION $$E'(i) = e + E(i)$$

S5: RETRIEVE SAMPLE IMAGE FROM CLIENT TERMINAL

S6: RECEIVE, FROM CLIENT TERMINAL, MOUNTING LOCATION AND POSTURE OF SAMPLE IMAGE WITHIN AMBIENT LIGHT IMAGE

S7: USING CORRECTED ILLUMINATION INTENSITY MAP E', SIMULATE MANNER OF HOW SAMPLE IMAGE LOOKS IN RESPONSE TO POSTURE

S8: DISPLAY SIMULATION RESULTS ON DISPLAY OF CLIENT TERMINAL

AMBIENT LIGHT IMAGE: BLUE SKY

NOT CORRECTED WITH INFORMATION
ON MAIN ILLUMINATION

101

AMBIENT LIGHT IMAGE: BLUE SKY

CORRECTED WITH INFORMATION
ON MAIN ILLUMINATION

102

AMBIENT LIGHT IMAGE: BLUE SKY

NOT CORRECTED WITH INFORMATION
ON MAIN ILLUMINATION

101

AMBIENT LIGHT IMAGE: BLUE SKY

CORRECTED WITH INFORMATION
ON MAIN ILLUMINATION

S1: RETRIEVE AMBIENT LIGHT IMAGE FROM CLIENT TERMINAL

E
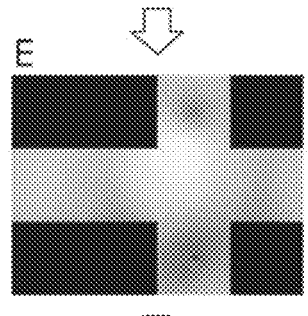

S2: GENERATE ILLUMINATION INTENSITY MAP E e
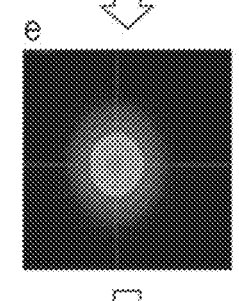

S3: ACQUIRE INFORMATION e ON MAIN ILLUMINATION BY ANALYZING ILLUMINATION INTENSITY MAP E

E'
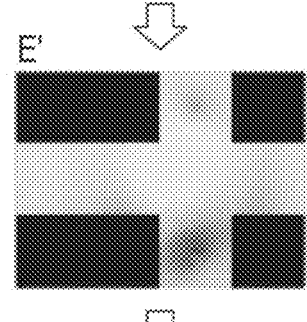

S4A: GENERATE ILLUMINATION INTENSITY MAP E' BY CORRECTING ILLUMINATION INTENSITY MAP E WITH WEIGHTED MEAN OF ILLUMINATION INTENSITY MAP E AND INFORMATION e ON MAIN ILLUMINATION $$E'(i) = e*c + E(i)*(1-c)$$

c: CORRECTION COEFFICIENT

S5: RETRIEVE SAMPLE IMAGE FROM CLIENT TERMINAL

S6: RECEIVE, FROM CLIENT TERMINAL, MOUNTING LOCATION AND POSTURE OF SAMPLE IMAGE WITHIN AMBIENT LIGHT IMAGE

S7: USING CORRECTED ILLUMINATION INTENSITY MAP E', SIMULATE MANNER OF HOW SAMPLE IMAGE LOOKS IN RESPONSE TO POSTURE

S8: DISPLAY SIMULATION RESULTS ON DISPLAY OF CLIENT TERMINAL

FIG. 7

S1: RETRIEVE AMBIENT LIGHT IMAGE FROM CLIENT TERMINAL

E

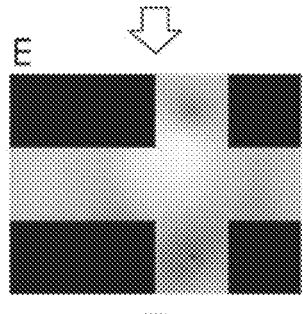

S2: GENERATE ILLUMINATION INTENSITY MAP E e

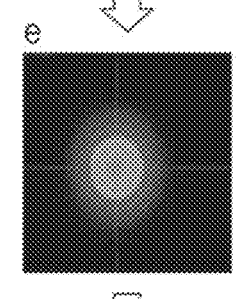

S3: ACQUIRE INFORMATION e ON MAIN ILLUMINATION BY ANALYZING ILLUMINATION INTENSITY MAP E

E'

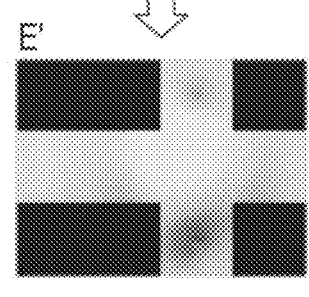

S4B: GENERATE ILLUMINATION INTENSITY MAP E' BY CORRECTING ILLUMINATION INTENSITY MAP E WITH INFORMATION ON MAIN ILLUMINATION $$E'(i) = e * w(i) + E(i)$$

w: GLOSS COEFFICIENT

S5: RETRIEVE SAMPLE IMAGE FROM CLIENT TERMINAL

S6: RECEIVE, FROM CLIENT TERMINAL, MOUNTING LOCATION AND POSTURE OF SAMPLE IMAGE WITHIN AMBIENT LIGHT IMAGE

S7: USING CORRECTED ILLUMINATION INTENSITY MAP E', SIMULATE MANNER OF HOW SAMPLE IMAGE LOOKS IN RESPONSE TO POSTURE

S8: DISPLAY SIMULATION RESULTS ON DISPLAY OF CLIENT TERMINAL

GLOSS COEFFICIENT w f(d)

0

DISTANCE d

E d

● LOCATION OF MAIN
ILLUMINATION

○ LOCATION OF PIXEL i ON
ILLUMINATION INTENSITY MAP

AMBIENT LIGHT IMAGE: BLUE SKY
CORRECTED WITH INFORMATION
ON MAIN ILLUMINATION

AMBIENT LIGHT IMAGE: BLUE SKY
GLOSS CORRECTED

AMBIENT LIGHT IMAGE

S1: RETRIEVE AMBIENT LIGHT IMAGE FROM CLIENT TERMINAL

E

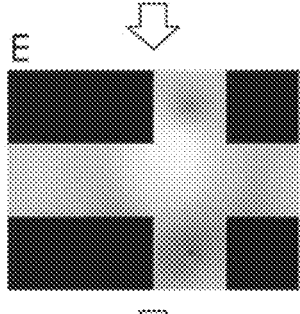

S2: GENERATE ILLUMINATION INTENSITY MAP E e

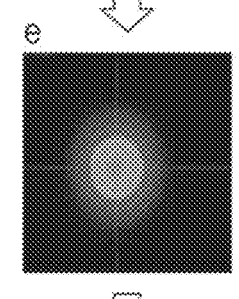

S3: ACQUIRE INFORMATION e ON MAIN ILLUMINATION BY ANALYZING ILLUMINATION INTENSITY MAP E

E'

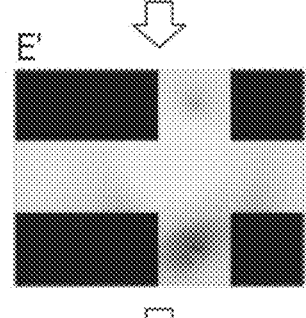

S4C: GENERATE ILLUMINATION INTENSITY MAP E' BY CORRECTING ILLUMINATION INTENSITY MAP E WITH INFORMATION ON MAIN ILLUMINATION $$E'(i) = e*w(i)*Tr + E(i)$$

w: GLOSS COEFFICIENT
Tr: WEIGHTING COEFFICIENT

S5: RETRIEVE SAMPLE IMAGE FROM CLIENT TERMINAL

S6: RECEIVE, FROM CLIENT TERMINAL, MOUNTING LOCATION AND POSTURE OF SAMPLE IMAGE WITHIN AMBIENT LIGHT IMAGE

S7: USING CORRECTED ILLUMINATION INTENSITY MAP E', SIMULATE MANNER OF HOW SAMPLE IMAGE LOOKS IN RESPONSE TO POSTURE

S8: DISPLAY SIMULATION RESULTS ON DISPLAY OF CLIENT TERMINAL

FIG. 14

AMBIENT LIGHT IMAGE

S1: RETRIEVE AMBIENT LIGHT IMAGE FROM CLIENT TERMINAL

E
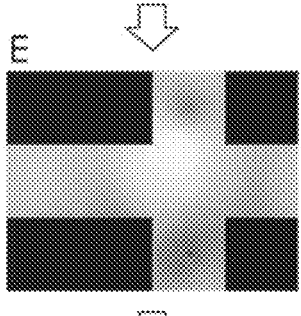

S2: GENERATE ILLUMINATION INTENSITY MAP E e
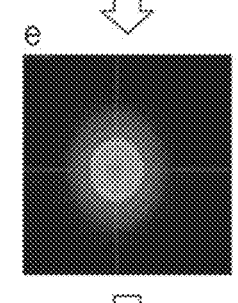

S3: ACQUIRE INFORMATION e ON MAIN ILLUMINATION BY ANALYZING ILLUMINATION INTENSITY MAP E

E'
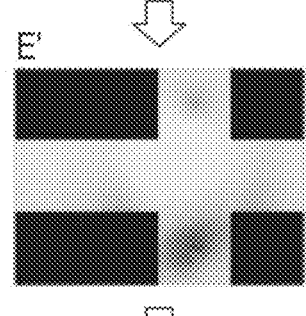

S4D: GENERATE ILLUMINATION INTENSITY MAP E' BY CORRECTING ILLUMINATION INTENSITY MAP E WITH INFORMATION ON MAIN ILLUMINATION $$E'(i) = e \cdot w(i) \cdot Tr + E(i) \cdot (1.0 - Tr)$$

w: GLOSS COEFFICIENT
Tr: WEIGHTING COEFFICIENT

S5: RETRIEVE SAMPLE IMAGE FROM CLIENT TERMINAL

S6: RECEIVE, FROM CLIENT TERMINAL, MOUNTING LOCATION AND POSTURE OF SAMPLE IMAGE WITHIN AMBIENT LIGHT IMAGE

S7: USING CORRECTED ILLUMINATION INTENSITY MAP E', SIMULATE MANNER OF HOW SAMPLE IMAGE LOOKS IN RESPONSE TO POSTURE

S8: DISPLAY SIMULATION RESULTS ON DISPLAY OF CLIENT TERMINAL

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-129310 filed Aug. 15, 2022.

BACKGROUND

(i) Technical Field

The present disclosure relates to an information processing apparatus, a non-transitory computer readable medium, and an information processing method.

(ii) Related Art

Physically-based rendering is available as one of techniques that reproduce using a computer technique how a thing looks in terms hue and gloss. However, the physically-based rendering involves higher computation costs and is not so beneficial in terms of real-time simulation. A technique of reducing computation costs to reproduce an illumination intensity distribution is available. According to the technique, the illumination intensity distribution is calculated in all normal directions of the thing.

Reference is made to Japanese Unexamined Patent Application Publication No. 2002-236938 for related art techniques.

Cameras capable of imaging all directions from an imaging point are commercially available. This type of camera is referred to a spherical camera and an image imaged by the spherical camera is referred to as a 360-degree panoramic image (spherical image). The spherical image includes information on ambient light ("luminance information") at the imaging point. The use of the spherical image enables the appearance of hue and gloss of an object at any point to be simulated. The spherical image (hereinafter referred to as an "ambient light image") is an example of image resulting from imaging an actual space.

On the other hand, the luminance information acquired from the spherical image may be different from the color and illumination intensity of main illumination in the actual space. For example, when the appearance of a white paper sheet placed in the clear sky condition is simulated, the paper sheet may be blue-tinted or illumination intensity may be reproduced at a lower level.

SUMMARY

Aspects of non-limiting embodiments of the present disclosure relate to causing simulation results to look more real than when the appearance of a subject is simulated using an image captured in an actual space.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire information on main illumination from an illumination intensity distribution of an image that results from imaging an actual space; and control an expression of a thing using an illumination intensity distribution that is corrected with the information on the main illumination.

BRIEF DESCRIPTION OF THE DRAWINGS

Exemplary embodiments of the present disclosure will be described in detail based on the following figures, wherein:

FIG. 3 illustrates a first simulation example performed by a processor;

FIG. 6 illustrates a second simulation example performed by the processor;

FIG. 7 illustrates a third simulation example performed by the processor;

FIG. 12 illustrates a fourth simulation example performed by the processor;

FIG. 14 illustrates a fifth simulation example performed by the processor; and

DETAILED DESCRIPTION

Exemplary embodiments of the disclosure are described with reference to the drawings.

First Exemplary Embodiment

System Configuration

Figure 1:
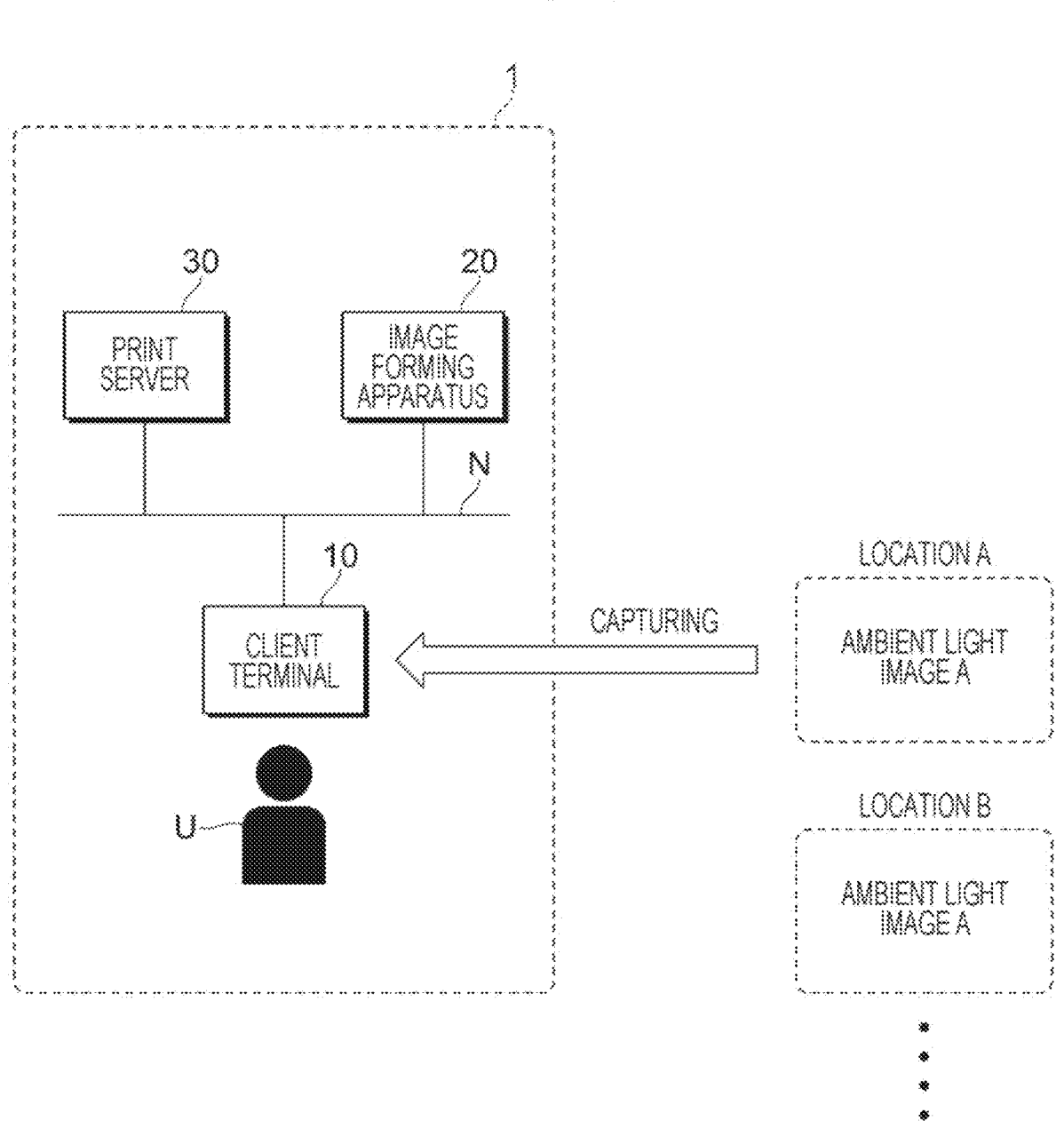
FIG. 1 illustrates a configuration of a print system of a first exemplary embodiment.

FIG. 1 illustrates a configuration of a print system 1 used in a first exemplary embodiment. The print system 1 includes a client terminal 10, image forming apparatus 20, and print server 30. These apparatuses are communicably interconnected to each other via a network N. The client terminal 10 and print server 30 are examples of an information processing apparatus.

Each of the client terminal 10 and print server 30 basically includes a computer. The image forming apparatus 20 and print server 30 may be connected to each other via an exclusive line.

The image forming apparatus 20 forms an image on a paper sheet, such as a recording medium. A recording material used to record the image may be toner or ink. Colors of recording materials include fundamental colors, such as yellow (Y), magenta (M), cyan (C), and black (K), and special colors, such as metallic color or fluorescent color.

The client terminal 10 may be a desktop computer, laptop, tablet computer, smart phone, or wearable computer. According to the first exemplary embodiment, the client terminal 10 is typically used as an input and output device.

The image forming apparatus 20 of the first exemplary embodiment may be a production printer, printer used in office, or printer used at home. The image forming apparatus 20 may include a scanner function besides a print function.

The print server 30 of the first exemplary embodiment has a function of receiving a print job from the client terminal 10 and outputting the print job to the image forming apparatus 20 and a function of simulating a texture of an object.

The texture refers to an impression that the hue and gloss of an object give to humans. The hue and gloss may be affected by an uneven structure of a surface of the object, a normal direction of the surface of the object, an incident direction of illumination, an intensity of the illumination, and a color of the illumination.

The print server 30 of the first exemplary embodiment receives from the client terminal 10 an image resulting from imaging an actual space (in other words, an ambient light image) and information on an object serving as a simulation target and reproduces using computer technology an appearance of the object at a posture specified by a user.

The client terminal 10 uploads the ambient light image used in simulation to the print server 30. Also, the print server 30 may download or read from the Internet the ambient light image indicated by the client terminal 10.

Referring to FIG. 1, the ambient light image imaged at a location A is referred to as an "ambient light image A," and the ambient light image imaged at a location B is referred to as an "ambient light image B."

The ambient light images include, for example, a spherical image, an upper-hemisphere image, and a plane image.

The upper-hemisphere image refers to an upper half of the spherical image above the equator. The upper-hemisphere image may not be strictly an image of a sphere from the equator to the apex but may be an image of the sphere from a given latitude to the apex.

The plane image refers to an image imaged by a camera, such as a smart phone, and having a specific angle of view.

A location where the ambient light image is imaged refers to a location where an object is observed. For example, the location may be a specific booth in an exhibition, an exhibition room, a conference room, or the like. The booth is a space delineated by partitions. The location where the ambient light image is imaged is not limited to an indoor environment and may be in an outdoor environment.

The observed textures of the same object may be different if the intensity and color of illumination light are different. With the intensity and color of the illumination light remaining unchanged, the observed texture of the object may be different if the incident direction of the illumination light and the normal direction of the surface of the object are different.

Referring to FIG. 1, a network N is a local-area network (LAN). The network N may be a wired network and/or wireless network. The wired network is, for example, Ethernet (registered trademark). The wireless network is, for example, Wi-Fi (registered trademark).

The network N in the print system 1 illustrated in FIG. 1 includes a single client terminal 10, a single image forming apparatus 20, and a single print server 30 but alternatively, a multiple number of each type of these apparatuses may be employed.

Configuration of Information Processing Apparatus

Figure 2:
FIG. 2 illustrates a hardware configuration of an information processing apparatus.

FIG. 2 illustrates a hardware configuration of an information processing apparatus. Referring to FIG. 2, the print server 30 is an example of the information processing apparatus. The client terminal 10 may also have the same hardware configuration as illustrated in FIG. 2.

The print server 30 illustrated in FIG. 2 includes a processor 31, read-only memory (ROM) 32 storing basic input-output system (BIOS), random-access memory (RAM) 33 used as a working area of the processor 31, auxiliary memory 34, user interface 35, and communication interface 36.

These devices are interconnected to each other via a bus, such as a signal line 37.

The processor 31 is a device that implements a variety of functions by executing a program.

The processor 31, ROM 32, and RAM 33 work as a computer.

The auxiliary memory 34 includes a hard disk device or a semiconductor storage. The auxiliary memory 34 stores a program and a variety of data. The program herein collectively refers to the operating system and application programs. One of the application programs is a program that simulates the texture of the object.

Referring to FIG. 2, the auxiliary memory 34 is built in the print server 30 but the auxiliary memory 34 may be external to the print server 30 or present over the network N (see FIG. 1).

The user interface 35 includes an output device and an input receiving device.

The output device may include, for example, a display and a loudspeaker. The display is a liquid-crystal display or an organic electroluminescent display.

The input receiving device may include, for example, a power button, keyboard, mouse, touch sensor, and the like. The touch sensor is, for example, an electrostatic capacitance sensor. A combination of the touch sensor and the display is referred to as a touch panel.

The communication interface 36 performs communication with the client terminal 10 and image forming apparatus 20 via the network N (as illustrated in FIG. 1). The communication interface 36 supports a variety of existing communication standards. The communication standards include Ethernet (registered trademark) and Wi-Fi (registered trademark).

Simulation Process of Texture

A simulation process that the processor 31 (see FIG. 2) performs by executing the program is described below.

The simulation process of the texture according to the first exemplary embodiment starts when the client terminal 10 provides the print server 30 with an object serving as a simulation target and the ambient light image.

According to the first exemplary embodiment, the object is a white paper sheet. A color chart is printed on the paper sheet. The color chart is a collection of color samples.

The ambient light image is a spherical image imaged outdoors. The spherical image is a picture of the blue sky and the sun.

First Simulation Example

FIG. 3 illustrates a first simulation example performed by the processor 31. The letter S in FIG. 3 is the abbreviation of the word "step."

Step 1

The processor 31 retrieves the ambient light image from the client terminal 10. The ambient light image gives information on the ambient light at an imaging point.

Step 2

The processor 31 generates a diffuse reflection illumination intensity map (hereinafter referred to as illumination intensity map E) from the acquired ambient light image. The illumination intensity map E represents an illumination intensity distribution or a luminance distribution of the ambient light image. Each of the illumination intensity distribution and luminance distribution is information representing a distribution of brightness per unit area. According to the first exemplary embodiment, the two distributions are collectively referred to as an "illumination intensity distribution."

The illumination intensity map E may be produced using one of related-art techniques. For example, the processor 31 generates an environment map where the ambient light image is glued on the surface of a virtual cube and generates the illumination intensity map E from the produced environment map. The environment map and the illumination intensity map are cube maps.

Step 3

The processor 31 acquires information e on main illumination by analyzing the illumination intensity map E.

According to the first exemplary embodiment, the main illumination is defined as a position that provides a maximum mean illumination intensity value within a unit area. The main illumination may be identified using a maximum value, a percentile value, or a luminance variance of illumination intensities within the unit area. According to the first exemplary embodiment, the position where a mean illumination intensity value appears is set to be the location of the main illumination to remove the effect of noise.

The processor 31 estimates the color and intensity of the main illumination as the information e on the main illumination. Alternatively, the processor 31 may estimate only the color or only the intensity of the main illumination. It is noted that the information e on the main illumination is not limited to the color and intensity of the illumination light.

Step 4

The processor 31 generates a corrected illumination intensity map E' by correcting the illumination intensity map E with the information e on the main illumination.

Referring to FIG. 3, the processor 31 calculates the corrected illumination intensity map E' in accordance with the following equation:

$$E'(i)=e+E(i).$$

It is noted that i represents each pixel on the illumination intensity map E and the corrected illumination intensity map E'.

The corrected illumination intensity map E' in step 4 is calculated by adding the information e on the main illumination to all pixels of the illumination intensity map E. The information e on the main illumination herein is a fixed value.

The illumination intensity map E is an example of a first function representing the illumination intensity distribution. The information e on the main illumination is an example of a second function. The corrected illumination intensity map E' is an example of a third function.

Step 5

The processor 31 retrieves a sample image from the client terminal 10.

The sample image is a white paper sheet having a color chart printed thereon. The sample image is uploaded as an image file from the client terminal 10 to the print server 30.

The sample image and ambient light image may be concurrently uploaded.

Step 6

The processor 31 receives from the client terminal 10 the mounting location and posture of the sample image within the ambient light image.

The posture is defined by the normal direction of the paper sheet. The posture of the sample image with respect to the main illumination plays a main role.

Step 7

Using the corrected illumination intensity map E', the processor 31 simulates the appearance of the sample image in response to the posture. The method of simulating the appearance of the sample image using an illumination intensity map is one of related-art techniques.

Step 8

The processor 31 displays simulation results on a display of the client terminal 10.

Figure 4:
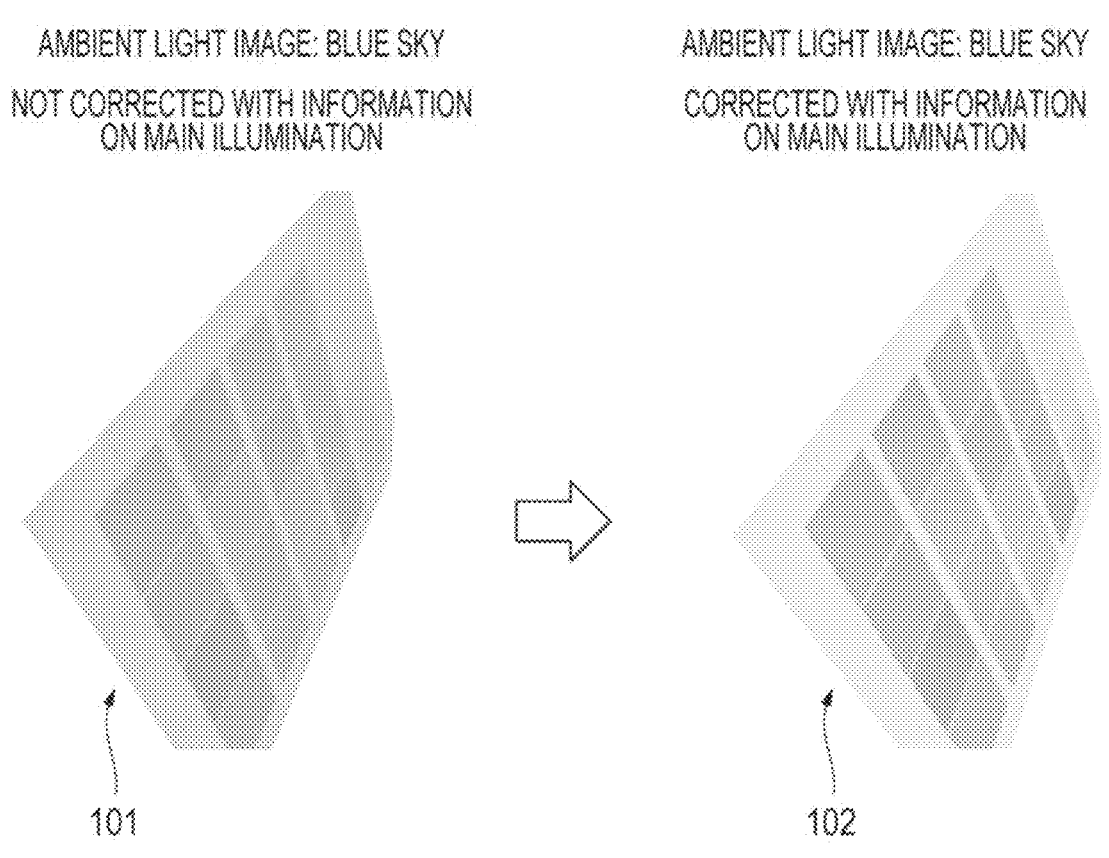
FIG. 4 illustrates an example of simulation results displayed on a display.

FIG. 4 illustrates an example of the simulation results displayed on the display.

A sample image 101 indicates how the simulation results look before being corrected with the information e on the main illumination and a sample image 102 indicates how the simulation results look after being corrected with the information e on the main illumination. Referring to FIG. 4, the state prior to correction is described as "not corrected with information on main illumination" and the state subsequent to the correction is described as "corrected with information on main illumination."

In each of the sample image 101 and sample image 102, the normal direction of the paper sheet faces the sun serving as the main illumination in the ambient light image.

The color of the sky is used as the color of the illumination light in the simulation of the sample image 101. As a result, the white paper sheet is reproduced in a blue-tinted color. The simulation results are an unnatural appearance different from the actual appearance.

On the other hand, the color of the sunlight (white-color lighting) of the main illumination of the illumination intensity map E serving as the color of the illumination light is dominant in the simulation of the sample image 102. As a result, the white paper sheet is reproduced to be white.

The simulation using the corrected illumination intensity map E' may cause the appearance of the simulation results to look more like an actual object.

Figure 5:
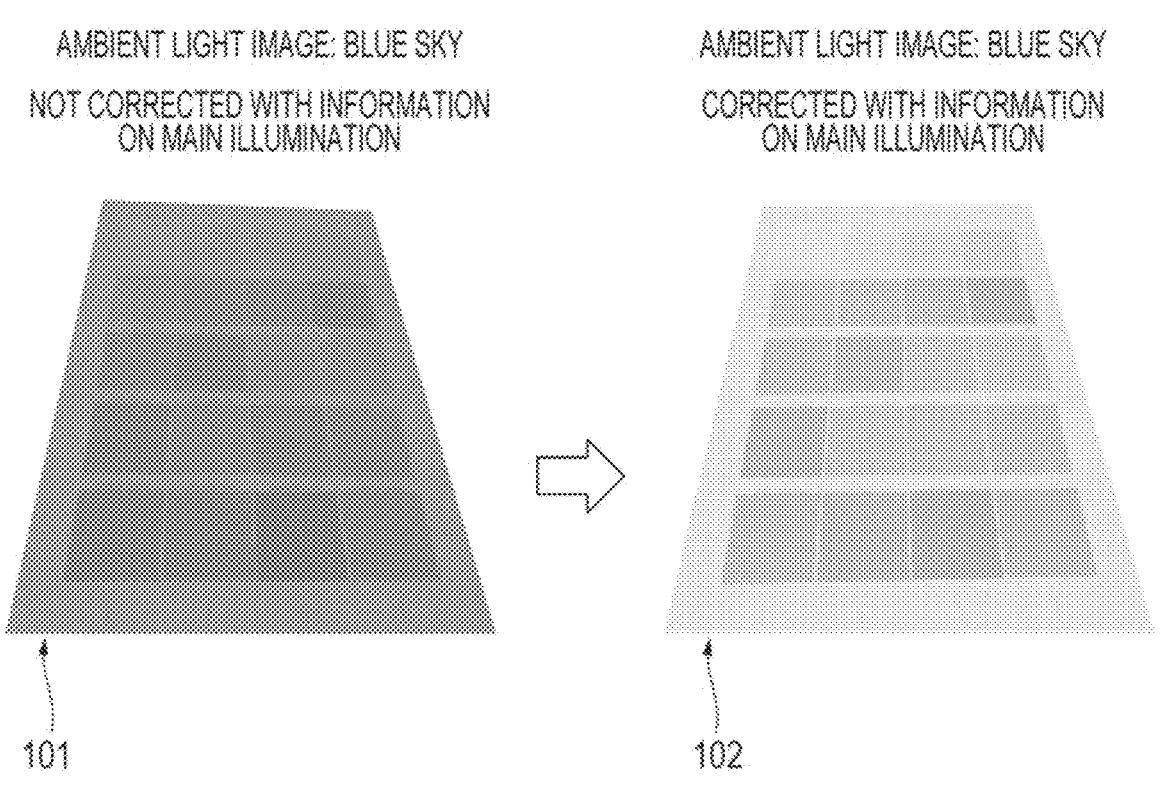
FIG. 5 illustrates another example of the simulation results displayed on the display.

FIG. 5 illustrates another example of the simulation results displayed on the display.

The sample image 101 indicates how the simulation results look before being corrected with the information e on the main illumination and the sample image 102 indicates how the simulation results look after being corrected with the information e on the main illumination. Referring to FIG. 5, the state prior to the correction is described as "not corrected with information on main illumination" and the state subsequent to the correction is described as "corrected with information on main illumination."

Referring to FIG. 5, in each of the sample image 101 and sample image 102, the normal direction of the paper sheet is not in alignment with the direction of the sun serving as the main illumination in the ambient light image.

The paper sheet is reproduced to be darker in the sample image 101 in FIG. 5. The simulation results look unnatural, and is thus different from the actual appearance.

The intensity of the corrected illumination intensity map E' used in the simulation of the sample image 102 in FIG. 5 is corrected to a value higher than the illumination intensity map E. Even when the normal direction of the paper sheet is not in alignment with the direction of the sun, the brightness of the sample image 102 is reproduced to be higher than the sample image 101. The simulation using the corrected illumination intensity map E' may cause the simulation results to look closer to the actual appearance.

Second Simulation Example

FIG. 6 illustrates a second simulation example performed by the processor 31. Referring to FIG. 6, steps identical to the steps in FIG. 3 are designated with the same step numbers.

In the second simulation example, step 4A is performed in place of step 4. The operations in the remaining steps in the second simulation example are respectively identical to the operations in the first simulation example.

Step 4A

The processor 31 generates the corrected illumination intensity map E' by correcting the illumination intensity map E with a weighted mean of the illumination intensity map E and the information e on the main illumination.

Referring to FIG. 6, the processor 31 corrects the illumination intensity map E in accordance with the following equation:

$$E'(i)=e*c+E(i)*(1-c).$$

It is noted that i represents each pixel on the illumination intensity map E and the corrected illumination intensity map E' and c represents a correction coefficient. The correction coefficient c satisfies the condition of $0<c<1$.

In the second simulation example, the color and intensity of the main illumination are added to all pixels of the illumination intensity map E.

However, because of the value of the correction coefficient c, the value of the correction coefficient c makes the effect of the color and intensity of the main illumination on each pixel on the corrected illumination intensity map E' in the second simulation example smaller than the effect of the color and intensity of the main illumination in the first simulation example.

In the second simulation example, the value of the correction coefficient c may be specified on the display of the client terminal 10. Alternatively, the correction coefficient c may be set by vendor side.

In the second simulation example, the correction coefficient c may be modified in view of the environment of a location where the ambient light image is imaged or the time of the imaging. The simulation results may thus be set to be even closer to the actual appearance.

Third Simulation Example

FIG. 7 illustrates a third simulation example performed by the processor 31. Referring to FIG. 7, steps identical to the steps in FIG. 3 are designated with the same step numbers.

In the third simulation example, step 4B is performed in place of step 4. The operations in the remaining steps in the third simulation example are respectively identical to the operations in the first simulation example.

In the first and second simulation examples, the same value is added to all pixels in the illumination intensity map E. In other words, illumination intensities at all pixels are corrected to be higher than the illumination intensity map E but the illumination intensity after the correction is limited by an upper limit. As a result, the illumination intensity distribution becomes flatter than prior to the correction and the simulation results with the gloss reduced may be obtained.

Step 4B

The processor 31 corrects the information e on the main illumination with an index that represents gloss in response to a positional relationship between the location of the main illumination and each pixel in the illumination intensity map. The index may be a gloss coefficient w.

Referring to FIG. 7, the processor 31 calculates the corrected illumination intensity map E' in accordance with the following equation:

$$E'(i)=e*w(i)+E(i).$$

It is noted that i represents each pixel on the illumination intensity map E and the corrected illumination intensity map E'.

Figure 8A:
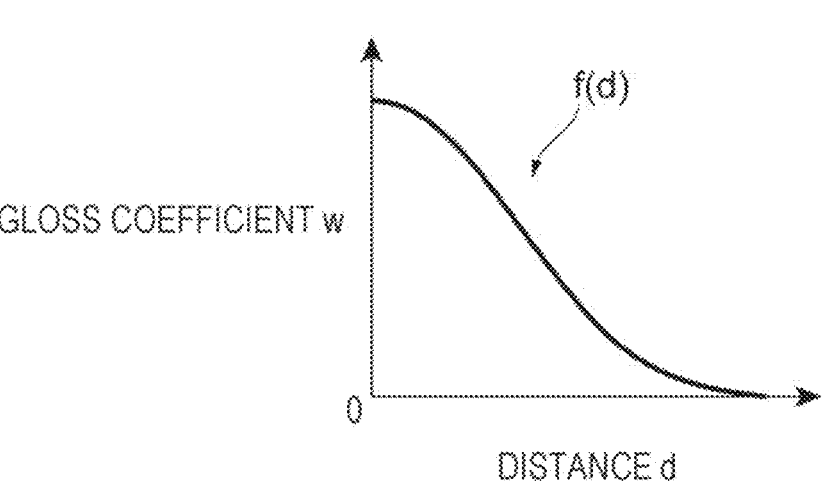
FIGS. 8A and 8B illustrate a gloss coefficient that is defined by a distance between main illumination and each pixel.
Figure 8B:
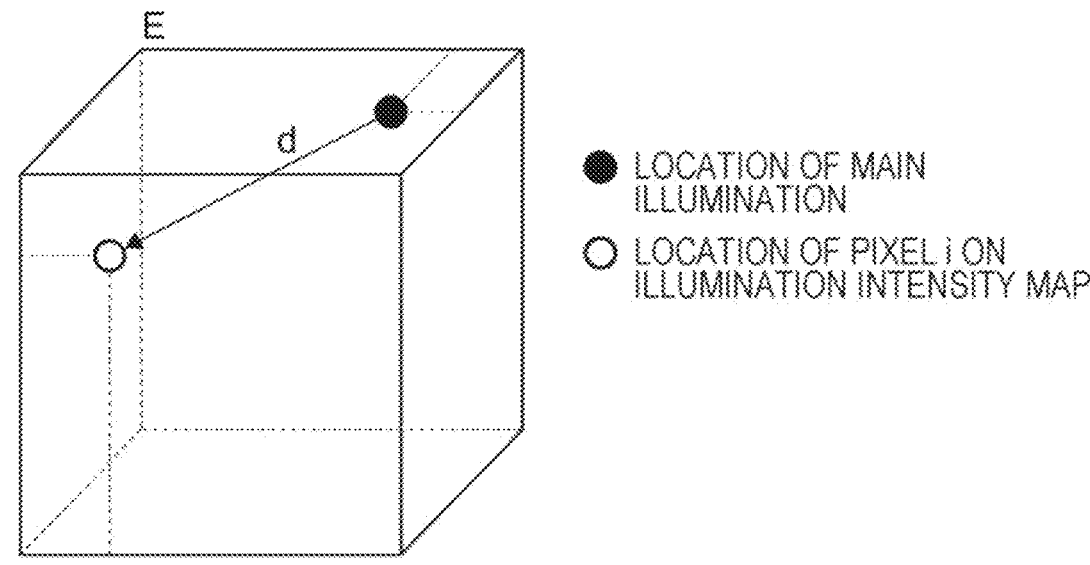

FIGS. 8A and 8B illustrate the gloss coefficient w that is defined by a distance d between the main illumination and each pixel i.

Referring to FIGS. 8A and 8B, the gloss coefficient w is defined by a function f(d) having a distance d as a variable. The maximum value of the gloss coefficient w is higher than 1.

According to the first exemplary embodiment, the distance d is calculated as a distance between the location of the main illumination and each pixel i on the cube map.

In the function f(d) in FIG. 8A, the gloss coefficient w having a higher value is used for a pixel i having a shorter distance d and the gloss coefficient w having a lower value is used for a pixel i having a longer distance d. Specifically, the value of the gloss coefficient w is higher as the distance d is shorter.

Referring to FIGS. 8A and 8B, the function is non-linear and sharply reduced when the distance d to the main illumination exceeds a reference value. This does not necessarily exclude the possibility that the function is linearly reduced or stepwise reduced.

Figure 9A:
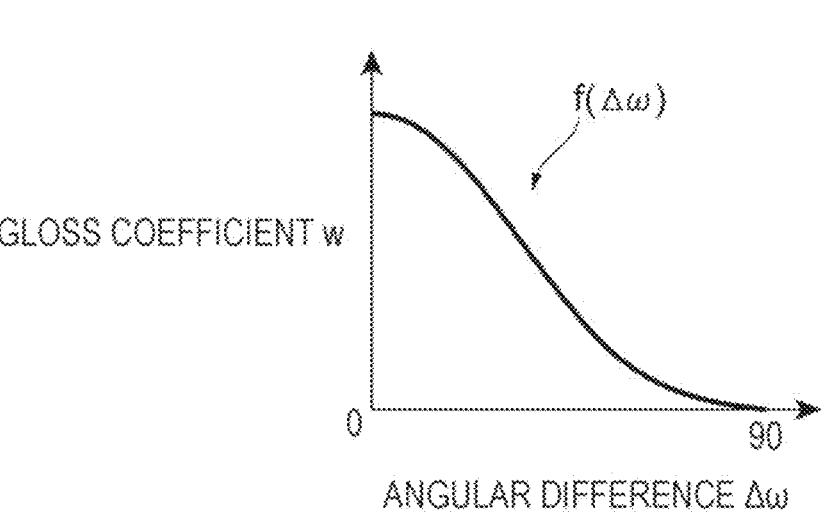
FIGS. 9A and 9B illustrate the gloss coefficient that is defined by an angular difference between the main illumination and each pixel.
Figure 9B:
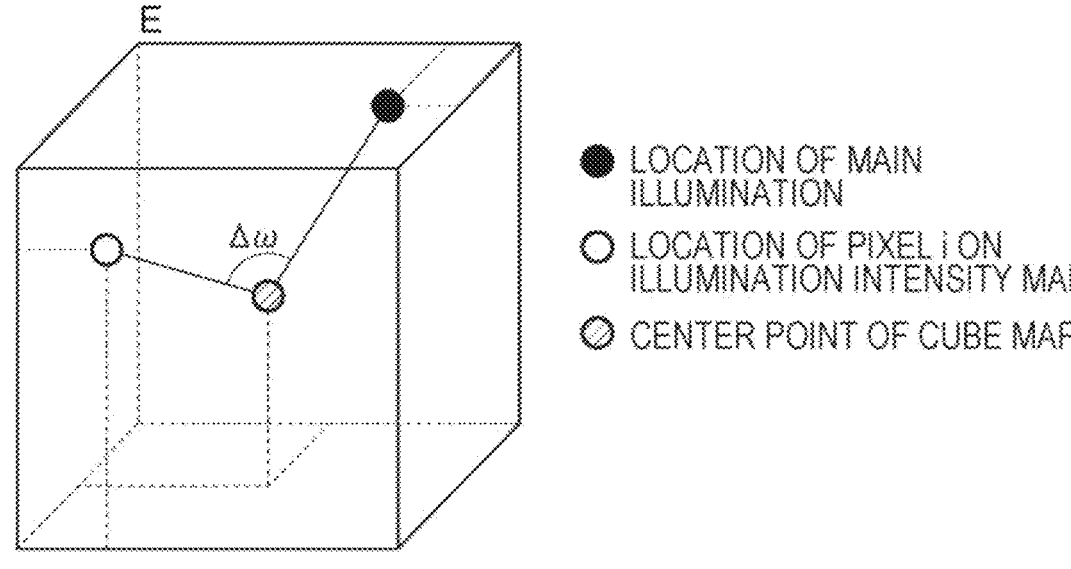

FIGS. 9A and 9B illustrate the gloss coefficient w that is defined by an angular difference Δω between the main illumination and each pixel i. The angular difference Δω is an angle made by a straight line connecting the center of a cube map to the location of the main illumination and a straight line connecting the center of the cube map to the position of each pixel i.

Referring to FIG. 9B, the straight line connecting the center of the cube map to the location of the main illumination represents the direction of the normal line passing through the location of the main illumination. The straight line connecting the center of the cube map to the position of each pixel i represents the normal direction of each pixel i.

The angular difference Δω of zero signifies that the main illumination is positioned in the normal direction of each pixel i. The angular difference Δω closer to 90° signifies that the normal direction of each pixel i is at about 90° from the direction of the main illumination.

The angular difference Δω of zero also signifies that the component of light reflected in the normal direction of the pixel i is maximized.

On the other hand, the angular difference Δω of 90° also signifies that the light reflected in the normal direction of the pixel i is minimized.

In the function (Δω) in FIG. 9A, the gloss coefficient w having a larger value is used for the pixel i having a smaller angular difference Δω while the gloss coefficient w having a smaller value is used for the pixel i having a larger angular difference $\Delta\omega$. Specifically, the value of the gloss coefficient w is higher as the distance d is shorter.

Referring to FIG. 9A, the function is non-linear and sharply reduced when the angular difference $\Delta\omega$ from the main illumination exceeds a reference value. This does not necessarily exclude the possibility that the function is linearly reduced or stepwise reduced.

Figure 10:
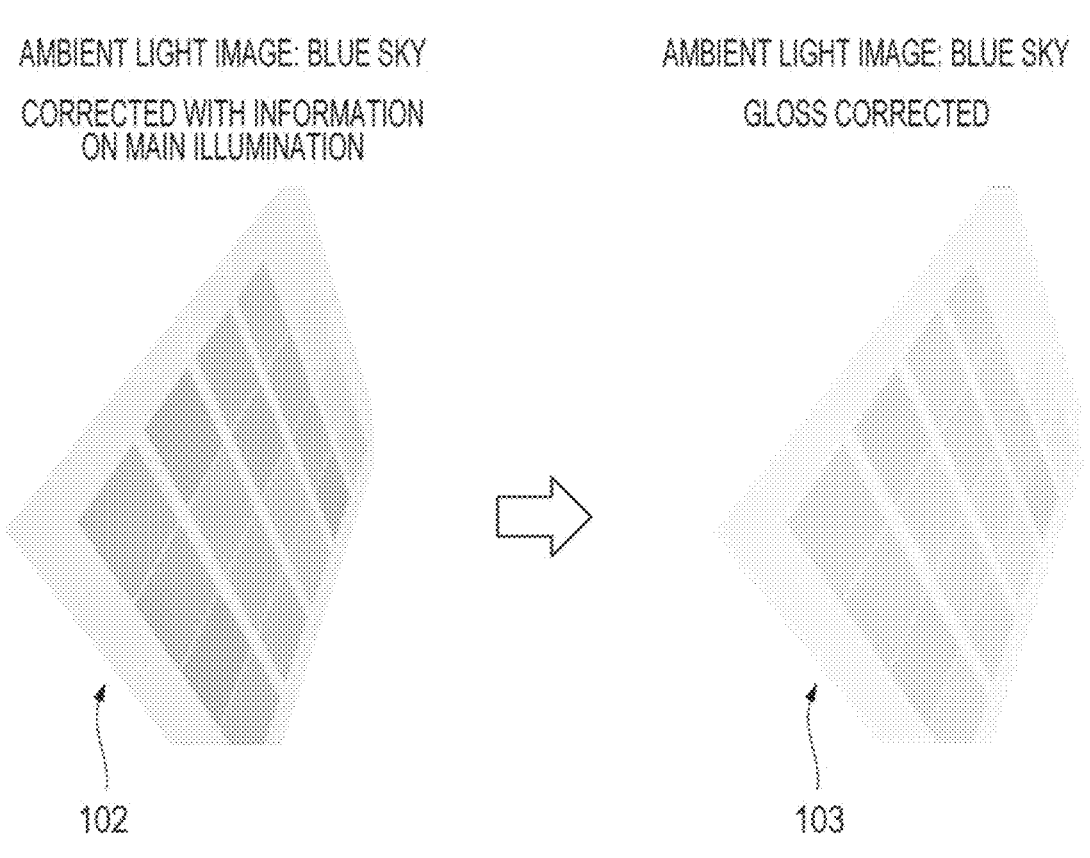
FIG. 10 illustrates another example of simulation results displayed on the display.

FIG. 10 illustrates another example of the simulation results displayed on the display. Referring to FIG. 10, elements identical to the elements in FIG. 4 are designated with the same reference numerals.

The simulation results in FIG. 10 indicate that the normal direction of the paper sheet is substantially in alignment with the direction of the main illumination, in other words, the angular difference $\Delta\omega$ is approximately zero.

The simulation results in FIG. 10 indicating that the normal direction of the paper sheet is substantially in alignment with the direction of the main illumination signifies that the distance d between the location of the main illumination and each pixel i of the sample image is shorter.

Referring to FIG. 10, the sample image 102 corresponds to the sample image 102 in the first and second simulation examples.

The correction with the information e on the main illumination on the sample image 102 is uniform to the whole sample image. For this reason, the appearance of the color chart in the sample image 102 remains substantially unchanged from the appearance of the color chart even when the illumination intensity is lower.

A sample image 103 indicates simulation results corrected with the gloss coefficient w. Referring to FIG. 10, the state corrected with the gloss coefficient w(i) is described as "corrected with gloss."

In the sample image 103 in FIG. 10, a value obtained by amplifying the information e on the main illumination by the gloss coefficient w is added to each pixel i on the entire paper sheet on the original illumination intensity map E. As a result, the illumination intensity of the entire paper sheet in the sample image 103 becomes higher than the illumination intensity of the sample image 102, causing the color chart to be whitish.

The simulation performed using the corrected illumination intensity map E' may cause the simulation results to look closer to the actual appearance.

Figure 11:
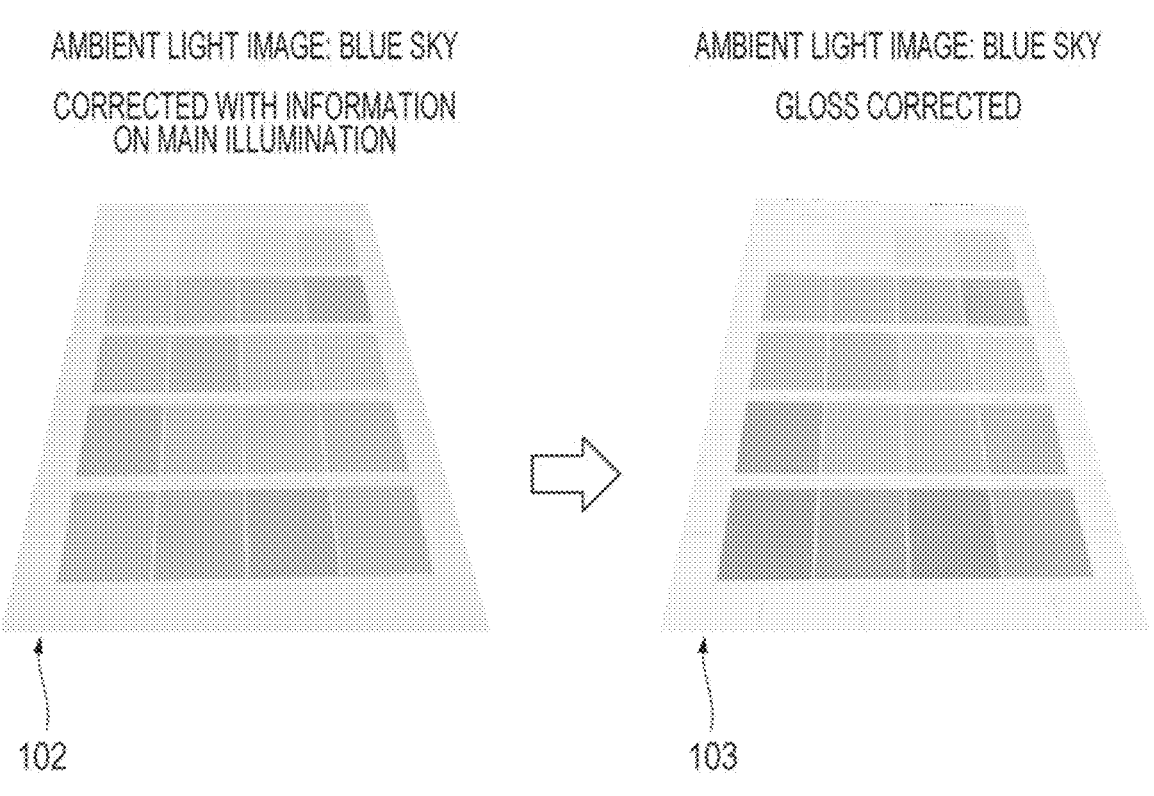
FIG. 11 illustrates another example of simulation results displayed on the display.

FIG. 11 illustrates another example of the simulation results displayed on the display.

Referring to FIG. 11, elements identical to the elements in FIG. 5 are designated with the same reference numerals.

The simulation results in FIG. 11 indicate that the normal direction of the paper sheet is tilted to be off alignment with the direction of the sun serving as the main illumination, namely, the angular difference $\Delta\omega$ is larger. The normal direction of the paper sheet tilted to be off alignment with the direction of the sun serving as the main illumination signifies that the distance d between the location of the main illumination and the pixel i of the sample image is longer.

In the sample image 102 in FIG. 11, the correction with the information e on the main illumination is uniform on the entire sample image. The appearance of the color chart in the sample image 102 remains substantially unchanged from the appearance of the color chart even when the illumination intensity is lower.

A value obtained by amplifying the information e on the main illumination by the gloss coefficient w is added to all pixels of the entire paper sheet on the original illumination intensity map E in the sample image 103.

As a result, the illumination intensity of the entire paper sheet in the sample image 103 becomes higher than the illumination intensity of the sample image 102, causing the color chart to be whitish. Since the main illumination is present in FIG. 10 but not present in FIG. 11 in the normal direction of the paper sheet, the appearance of the color chart in the sample image 103 in FIG. 11 is slightly closer to the appearance of the color chart in the sample image 102 than the appearance of the color chart in the sample image 103 in FIG. 10.

The simulation performed using the corrected illumination intensity map E' may cause the simulation results to look closer to the actual appearance.

Fourth Simulation Example

FIG. 12 illustrates a fourth simulation example performed by the processor 31.

Referring to FIG. 12, steps identical to the steps in FIG. 7 are designated with the same step numbers.

In the fourth simulation example, step 4C is performed in place of step 4B. The operations in the remaining steps in the fourth simulation is respectively identical to the operations in the third simulation example.
Step 4C The processor 31 uses, as an index indicating of the degree of gloss, a value w*Tr resulting from multiplying the gloss coefficient w by a weighting coefficient Tr. The index is determined by a positional relationship between the location of the main illumination and each pixel i on the illumination intensity map.

Referring to FIG. 12, the processor 31 calculates the corrected illumination intensity map E' in accordance with the following equation:

$$E'(i)=e*w(i)*Tr+E(i).$$

It is noted that i represents each pixel on the illumination intensity map E and the corrected illumination intensity map E'.

Figure 13A:
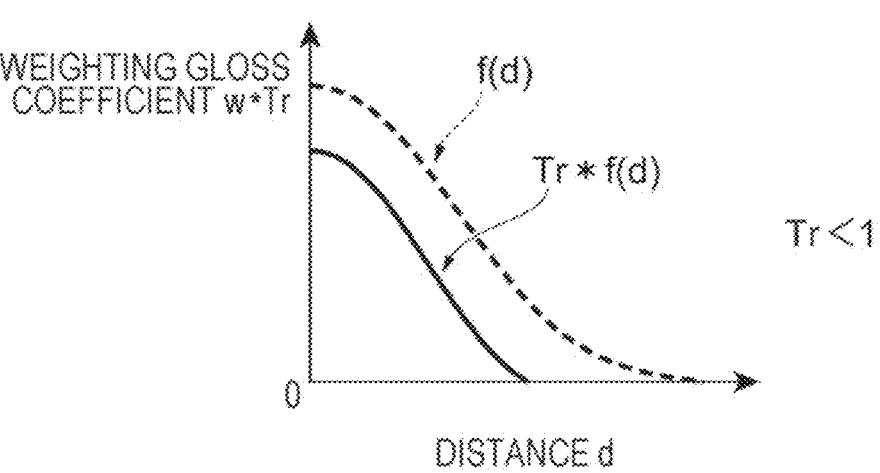
FIG. 13A illustrates a weighting gloss coefficient that is provided by a function of distance and FIG. 13B illustrates a weighting gloss coefficient that is provided by a function of angular difference.
Figure 13B:
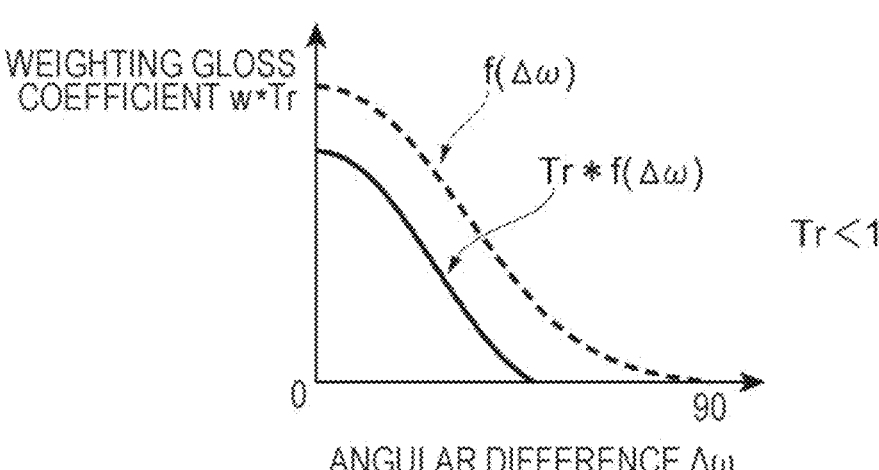

FIGS. 13A and 13B illustrate an example of a weighting gloss coefficient w*Tr. FIG. 13A illustrates the weighting gloss coefficient w*Tr in which the gloss coefficient w is obtained as a function f(d), and FIG. 13B illustrates a weighting gloss coefficient w*Tr in which the gloss coefficient w is obtained as a function $f(\Delta\omega)$ of the angular difference $\Delta\omega$.

The weighting coefficient Tr in FIGS. 13A and 13B is a fixed value that satisfies a condition of 0<Tr<1. The value of the function f(d) responsive to the distance d in FIG. 13A is smaller than the value of the function f(d) responsive to the distance d in FIG. 8A and the value of the function $(\Delta\omega)$ responsive to the angular difference $\Delta\omega$ in FIG. 13B is smaller than the value of the function $(\Delta\omega)$ responsive to the angular difference $\Delta\omega$ in FIG. 9A.

In the fourth simulation example, the effect of the gloss coefficient w may be adjusted by the value of the weighting coefficient Tr.

The value of the weighting coefficient Tr may be specified on the display of the client terminal 10. Alternatively, the weighting coefficient Tr may be set by the vendor side.

In the fourth simulation example, the simulation results may be set to be even closer to the actual appearance by modifying the weighting coefficient Tr in response to the environment of the location where the ambient light image is imaged and the time of imaging.

Fifth Simulation Example

FIG. 14 illustrates a fifth simulation example performed by the processor 31. Referring to FIG. 14, steps identical to the steps in FIG. 12 are designated with the same step numbers.

In the fifth simulation example, step 4D is performed in place of step 4C. The operations in the remaining steps in fifth simulation example is respectively identical to the operations in the fourth simulation example.

Step 4D

The processor 31 generates the corrected illumination intensity map E' by correcting the illumination intensity map E with the weighted mean of the information e on the main illumination corrected with the gloss coefficient w.

Referring to FIG. 14, the processor 31 calculates the corrected illumination intensity map E' in accordance with the following equation:

$$E'(i)=e*w(i)*Tr+E(i)*(1.0-Tr).$$

It is noted that i represents each pixel on the illumination intensity map E and the corrected illumination intensity map E', w(i) represents a gloss coefficient, and Tr represents a weighting coefficient. The weighting coefficient Tr satisfies the condition of $0<Tr<1$.

In the fifth simulation example as well, a value resulting from correcting the color and intensity of the main illumination with the gloss coefficient w is added to each of the pixels on the illumination intensity map E.

It is noted however that the value of the weighting coefficient Tr makes the effect of correcting, with the gloss coefficient w, the color and intensity of the main illumination in each pixel on the corrected illumination intensity map E' in the second simulation example is smaller than the effect of the correction in the fourth simulation example.

In the fifth simulation example, the value of the weighting coefficient Tr may be specified on the display of the client terminal 10. Alternatively, the weighting coefficient Tr may be set by the vendor side.

In the fifth simulation example, the simulation results may be set to be even closer to the actual appearance by modifying the weighting coefficient Tr in response to the environment of the location where the ambient light image is imaged and the time of imaging.

Second Exemplary Embodiment

Figure 15:
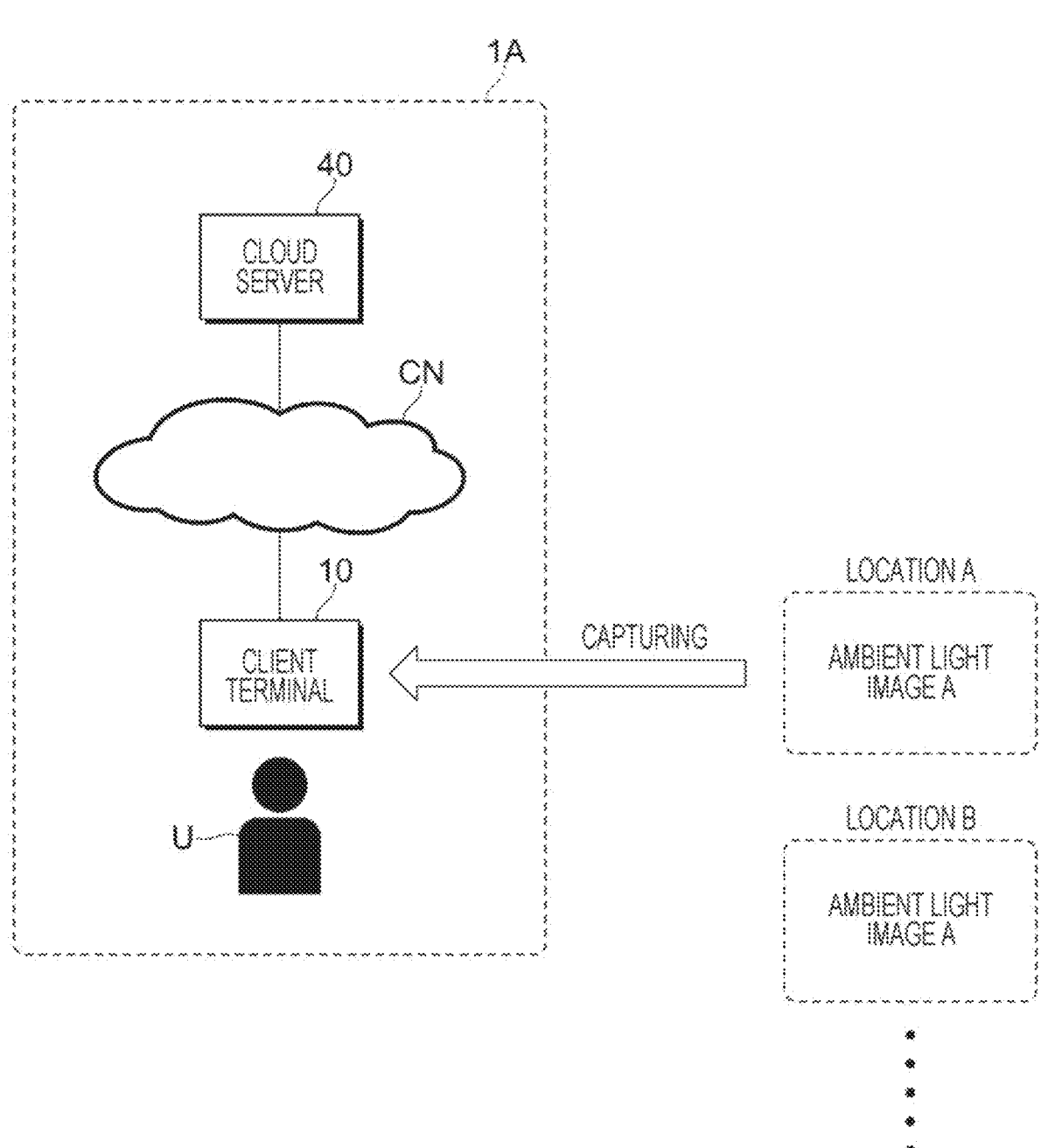
FIG. 15 illustrates a configuration of an information processing system used in a second exemplary embodiment.

FIG. 15 illustrates a configuration example of an information processing system 1A used in a second exemplary embodiment. In FIG. 15, elements identical to the elements in FIG. 1 are designated with the same reference numerals.

The information processing system 1A in FIG. 15 includes a client terminal 10 and cloud server 40. These apparatuses are communicably connected to each other via a cloud network CN.

The cloud server 40 is an example of an information processing apparatus. The hardware configuration of the cloud server 40 is identical to the hardware configuration in FIG. 2.

The information processing system 1A in FIG. 15 is different from the print system 1 in FIG. 1 in that the information processing system 1A is not based on the assumption that the image forming apparatus 20 (see FIG. 1) has an image forming function.

According to the second exemplary embodiment, the first through fifth simulation examples of texture are implemented by executing a program on the cloud server 40.

Referring to FIG. 15, the cloud server 40 specialized in the texture simulation is available. Alternatively, the client terminal 10 alone may perform the first through fifth simulation examples of texture.

Other Exemplary Embodiments (1) The exemplary embodiments of the disclosure have been described. The scope of the disclosure is not limited to the description of the exemplary embodiments. As defined by the claims, a variety of modifications and changes to the exemplary embodiments may fall within the scope of the disclosure.

(2) In the exemplary embodiments, the simulation target is a two-dimensional object, such as a paper sheet. Alternatively, the simulation target may be a three-dimensional object. If the simulation target is a three-dimensional object, the appearance of texture at an observation location is simulated using information defining the shape and surface of the three-dimensional object.

(3) In the second and fifth simulation examples in the exemplary embodiments, the sum of weights used in the weighted mean is 1. The sum of weights may not necessarily be 1.

(4) In the third simulation example of the exemplary embodiments, the gloss coefficient w is calculated using the distance d between the location of the main illumination and each pixel i on the cube map. Alternatively, the gloss coefficient w may be calculated using a distance on the spherical image. However, if the distance on the spherical image is calculated, the size of a sphere may be normalized to a unit sphere. Since a relative distance is acceptable as the distance d used to calculate the gloss coefficient w, normalization leads to no problem.

(5) In the third simulation example of the exemplary embodiments, the gloss coefficient w is calculated using the angular difference $\Delta\omega$ made by a straight line connecting the center of the cube map to the location of the main illumination and a straight line connecting the center of the cube map to the position of each pixel i. Alternatively, an angular difference on the spherical image may be used. However, if the angular difference $\Delta\omega$ is calculated on the spherical image, the size of a sphere may be normalized to a unit sphere. Since a relative distance is acceptable as the angular difference $\Delta\omega$ used to calculate the gloss coefficient w, normalization leads to no problem.

(6) In the embodiments above, the term "processor" refers to hardware in a broad sense. Examples of the processor include general processors (e.g., CPU: Main Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An information processing apparatus including:
a processor configured to:
acquire information on main illumination from an illumination intensity distribution of an image that results from imaging an actual space; and
control an expression of a thing using an illumination intensity distribution that is corrected with the information on the main illumination.

(((2)))
In the information processing apparatus according to (((1))), the processor is configured to estimate a color of the main illumination from the illumination intensity distribution and use the color of the main illumination as the information on the main illumination.

(((3)))
In the information processing apparatus according to one of (((1))) and (((2))), the processor is configured to estimate an intensity of the main illumination from the illumination intensity distribution and use the intensity of the main illumination as the information on the main illumination.

(((4)))
In the information processing apparatus according to one of (((1))) through (((3))), the processor is configured to determine a third function that results from adding to a first function representing the illumination intensity distribution a second function representing the information on the main illumination, and treat the third function as the corrected illumination intensity distribution.

(((5)))
In the information processing apparatus according to (((4))), the processor is configured to add a fixed value as the second function to the first function.

(((6)))
In the information processing apparatus according to (((4))), the processor is configured to determine, as the third function, a weighted mean of the first function and the second function.

(((7)))
In the information processing apparatus according to (((4))), the processor is configured to:
calculate an index indicative of a degree of gloss in accordance with a positional relationship between a location of the main illumination and each pixel on the illumination intensity distribution; and
determine the third function by adding to the first function the second function that is corrected with the calculated index.

(((8)))
In the information processing apparatus according to (((7))), the processor is configured to set a value of the index of a pixel having a shorter distance to the location of the main illumination to be larger than a value of the index of a pixel having a longer distance to the location of the main illumination.

(((9)))
In the information processing apparatus according to (((7))), the processor is configured to set a value of the index to a pixel having a smaller angular difference from the location of the main illumination to be larger than a value of the index of a pixel having a larger angular difference from the location of the main illumination.

(((10)))
In the information processing apparatus according to (((7))), the processor is configured to determine the third function by adding to the first function the second function with the index corrected with an weighting coefficient.

(((11)))
In the information processing apparatus according to (((7))), the processor is configured to determine as the third function a weighted mean of the first function and the second function corrected with the index.

(((12)))
A program causing a computer to execute a process, the process including:
acquiring information on main illumination from an illumination intensity distribution of an image that results from imaging an actual space; and
controlling an expression of a thing using an illumination intensity distribution that is corrected with the information on the main illumination.

What is claimed is:
1. An information processing apparatus comprising:
a processor configured to:
acquire information on main illumination from an illumination intensity distribution of an image that results from imaging an actual space; and
control an expression of a thing using a corrected illumination intensity distribution, wherein the corrected illumination intensity distribution is based on the information on the main illumination,
determine a third function that results from adding to a first function representing the illumination intensity distribution, a second function representing the information on the main illumination, and treat the third function as the corrected illumination intensity distribution;
calculate an index indicative of a degree of gloss in accordance with a positional relationship between a location of the main illumination and each pixel on the illumination intensity distribution; and
determine the third function by adding to the first function the second function that is corrected with the calculated index.
2. The information processing apparatus according to claim 1, wherein the processor is configured to estimate a color of the main illumination from the illumination intensity distribution and use the color of the main illumination as the information on the main illumination.
3. The information processing apparatus according to claim 2, wherein the processor is configured to estimate an intensity of the main illumination from the illumination intensity distribution and use the intensity of the main illumination as the information on the main illumination.
4. The information processing apparatus according to claim 1, wherein the processor is configured to estimate an intensity of the main illumination from the illumination intensity distribution and use the intensity of the main illumination as the information on the main illumination.
5. The information processing apparatus according to claim 1, wherein the processor is configured to add a fixed value as the second function to the first function.
6. The information processing apparatus according to claim 1, wherein the processor is configured to determine, as the third function, a weighted mean of the first function and the second function.

7. The information processing apparatus according to claim 1, wherein the processor is configured to set a value of the index of a pixel having a shorter distance to the location of the main illumination to be larger than a value of the index of a pixel having a longer distance to the location of the main illumination.

8. The information processing apparatus according to claim 1, wherein the processor is configured to set a value of the index to a pixel having a smaller angular difference from the location of the main illumination to be larger than a value of the index of a pixel having a larger angular difference from the location of the main illumination.

9. The information processing apparatus according to claim 1, wherein the processor is configured to determine the third function by adding to the first function the second function with the index corrected with a weighting coefficient.

10. The information processing apparatus according to claim 1, wherein the processor is configured to determine as the third function a weighted mean of the first function and the second function corrected with the index.

11. A non-transitory computer readable medium storing a program causing a computer to execute a process, the process comprising: acquiring information on main illumination from an illumination intensity distribution of an image that results from imaging an actual space; and controlling an expression of a thing using a corrected illumination intensity distribution, wherein the corrected illumination intensity distribution is based on the information on the main illumination, determining a third function that results from adding to a first function representing the illumination intensity distribution, a second function representing the information on the main illumination, and treat the third function as the corrected illumination intensity distribution; calculating an index indicative of a degree of gloss in accordance with a positional relationship between a location of the main illumination and each pixel on the illumination intensity distribution; and determining the third function by adding to the first function the second function that is corrected with the calculated index.

12. An information processing method comprising; acquiring information on main illumination from an illumination intensity distribution of an image that results from imaging an actual space; and controlling an expression of a thing using a corrected illumination intensity distribution, wherein the corrected illumination intensity distribution is based on the information on the main illumination, determining a third function that results from adding to a first function representing the illumination intensity distribution, a second function representing the information on the main illumination, and treat the third function as the corrected illumination intensity distribution; calculating an index indicative of a degree of gloss in accordance with a positional relationship between a location of the main illumination and each pixel on the illumination intensity distribution; and determining the third function by adding to the first function the second function that is corrected with the calculated index.

* * * * *